United States Patent [19]

Mori

[11] Patent Number: 4,890,806
[45] Date of Patent: Jan. 2, 1990

[54] STAND FOR A SOLAR RAY COLLECTING DEVICE

[76] Inventor: Kei Mori, 3-16-3-501, Kaminoge, Setagaya-ku, Tokyo, Japan

[21] Appl. No.: 308,708

[22] Filed: Feb. 9, 1989

[30] Foreign Application Priority Data

Apr. 20, 1988 [JP] Japan .................................. 63-98768

[51] Int. Cl.$^4$ ............................................ F16M 13/00
[52] U.S. Cl. .................................... 248/125; 248/176; 248/214; 108/48; 126/417
[58] Field of Search ............... 248/125, 676, 126, 146, 248/149, 152, 161, 413, 157, 176, 208, 236, 211, 238, 214, 215, 247, 248; 108/47, 48; 126/417, 424

[56] References Cited

U.S. PATENT DOCUMENTS

| | | | |
|---|---|---|---|
| 1,224,127 | 5/1917 | Bartlett | 108/47 |
| 1,627,241 | 5/1927 | Johnson | 248/236 |
| 1,921,401 | 8/1933 | Weiler | 248/208 |
| 2,302,344 | 11/1942 | O'Hara | 248/236 |
| 2,693,400 | 11/1954 | Erickson | 108/48 |
| 2,791,476 | 5/1957 | Atwill | 108/48 |
| 2,833,608 | 5/1958 | Tobias | 108/48 |
| 2,867,484 | 1/1959 | Jennings | 108/48 |
| 2,898,170 | 8/1959 | Antonius | 108/48 |
| 3,094,304 | 6/1963 | Linder | 248/211 |
| 3,433,443 | 3/1969 | Mangan | 248/236 |

FOREIGN PATENT DOCUMENTS

| | | | |
|---|---|---|---|
| 480827 | 12/1969 | Switzerland | 248/214 |
| 23513 | 10/1911 | United Kingdom | 248/540 |

Primary Examiner—Ramon O. Ramirez
Assistant Examiner—Robert A. Olson
Attorney, Agent, or Firm—Jordan and Hamburg

[57] ABSTRACT

A stand used for stably placing a solar ray collecting device on a veranda or the like comprises an upper base for directly and securely holding the solar ray collecting device, a hanger fixed to the base and hanging from a fixed construction such as a wall-like supporting member, being parallel to the solar ray collecting device, and a lower fixed base for adjustably supporting the upper base.

7 Claims, 4 Drawing Sheets

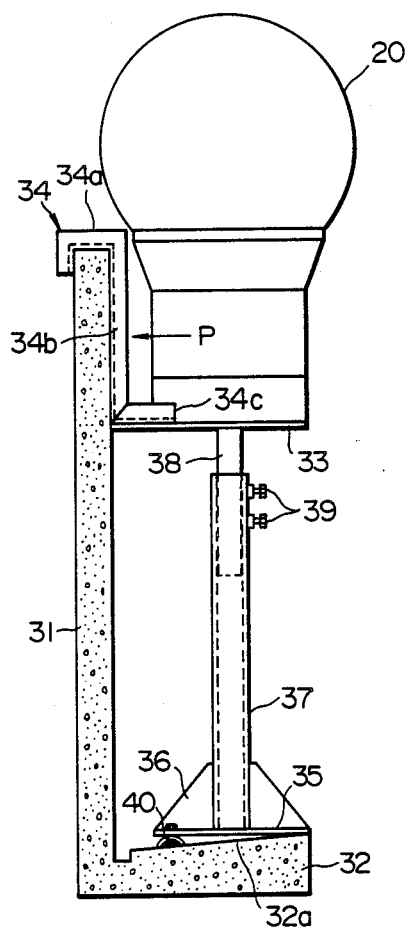

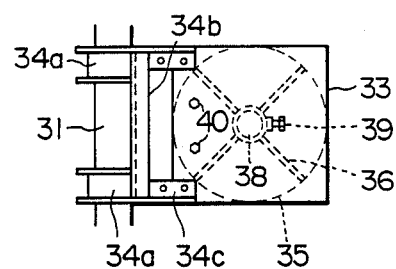
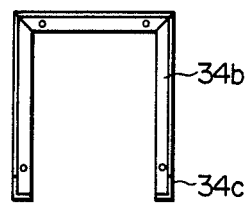
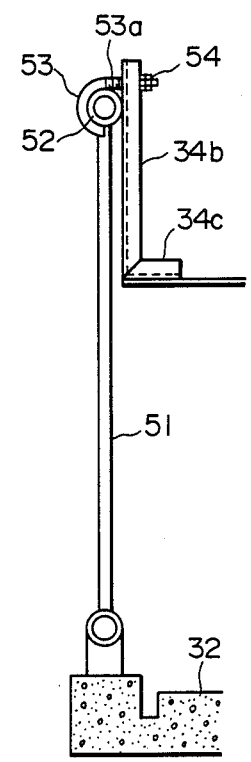

STAND FOR A SOLAR RAY COLLECTING DEVICE

BACKGROUND OF THE INVENTION

The present invention relates to a stand used for securely placing a solar ray collecting device on a veranda or the like.

In recent years, a large number of persons suffer from incurable diseases such as gout, neuralgia, bedsores and rheumatism; or pain from such injuries as bone fractures or other ill-defined diseases. Furthermore, no one is free from the aging of their skin which progresses gradually from a comparatively young age. On the other hand, the present applicant has previously proposed focusing the sun's rays or artificial light rays by using lenses or the like and guiding them into a fiber optic cable and then transmitting them to any place where the light is desired as for illumination or for other purposes such as cultivating indoor plants, chlorella, fish or the like. In the process of doing research, it has been found that the visible light not containing ultraviolet and infrared rays is effective not only for promoting health and preventing skin from the appearance of but also for aiding in healing gout, neuralgia, bedsores, rheumatism, burns, skin diseases, injuries bone fractures and so on as well as for relieving the pain from such diseases. And further, on the basis of the above-mentioned inventor's discovery, the applicant has previously proposed a light radiation device for irradiating with visible light not containing harmful ultraviolet and infrared rays, with the aim of using it for healing various kinds of diseases, giving beauty treatments and for promoting health. The aforementioned light radiating device is intended for indoor use, but can also be placed outdoors. Most of the solar ray collecting devices currently used for houses and residential buildings have been placed on the roof so as to effectively collect the sunlight. However, in many cities such as Tokyo there has been much new building of individual and multiple family residential dwellings in order to utilize the limited amount of land. Therefore it has become more difficult to place solar ray collecting devices on roof tops.

SUMMARY OF THE INVENTION

It is an object of the present invention to provide a stand which permits the secure placing of a solar ray collecting device on a veranda or the like.

It is another object of the present invention to provide a stand that is small and compact for saving space of a veranda.

It is another object of the present invention to provide a stand that is stable and safe support for a solar ray collecting device on a veranda.

BRIEF DESCRIPTION OF THE DRAWINGS

FIG'S. 3, 4 and 5 are views for explaining the construction of a stand embodying the features of the present invention for supporting a solar ray collecting device. FIG. 3 is a side view of said stand, FIG. 4 is a plane view and FIG. 5 is a fragmentary view taken in the direction of the arrow P shown in FIG. 3; and FIG. 6 shows a further embodiment of the present invention.

DESCRIPTION OF THE PREFERRED EMBODIMENTS

Figure 1:
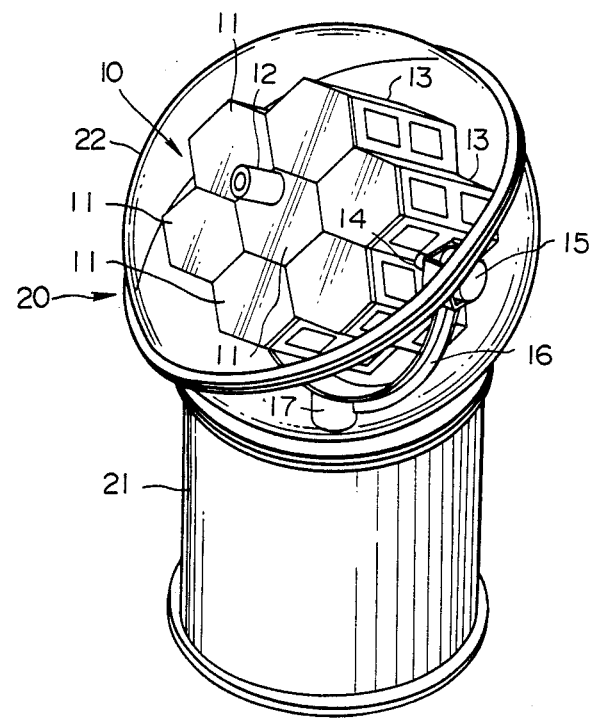
FIG. 1 is a view for explaining a solar ray collecting device to be placed on the stand provided according to present invention.

FIG. 1 is an entire perspective view illustrating, by way of example, a solar ray collecting device to be placed on the stand provided, according to the present invention.

In FIG. 1, a capsule 20 for use in the solar ray collecting device is constructed of a cylindrical body 21 and a transparent dome-shaped head 22. As shown in FIG. 1, the solar ray collecting device 10 is accommodated in the capsule when the device is being used. The solar ray collecting device 10 comprises one lens, several lenses or possibly a large number of lenses 11, a solar position sensor 12 for detecting the sun's location, a support frame body 13 for unitarily holding the lens 11 and the sensor 12, a first-revolution shaft 14 for rotating the support frame 13, a first-motor 15 for rotating the first revolution shaft 14, a support arm 16 for supporting the lens 11 or the motor 15, a second-revolution shaft 17 installed so as to intersect the first revolution shaft 14 perpendicularly thereto, and a second-motor, not shown in FIG. 1, for rotating the second revolution shaft 17. The direction of the sun is detected by means of the solar position sensor 12 and its detection signal controls the first and second motors so as to always direct the lens 11 toward the sun, and the sunlight focused by the lens 11 is guided into the fiber optic cable, not shown in FIG. 1, through its light-receiving end located at the lens' focal plane. The guided sunlight is transmitted through the fiber optic cable to wherever the light is needed.

Figure 2:
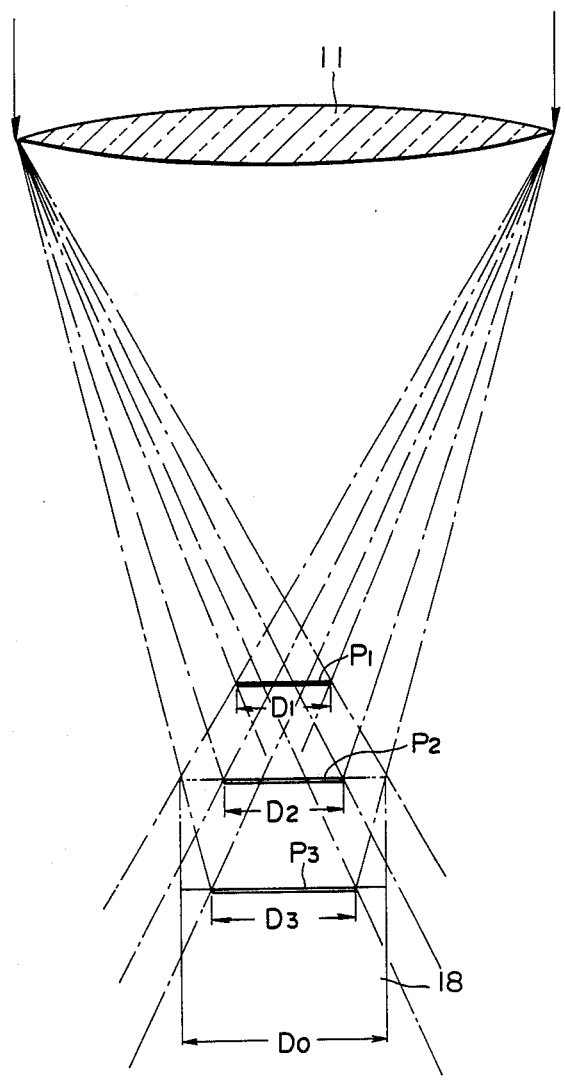
FIG. 2 is a view for explaining the principle of focusing solar rays through a lens system as shown in FIG. 1.

FIG. 2 is a view for explaining how to guide the light rays corresponding to the visible components of the sunlight into a fiber optic cable 18.

In FIG. 2, 11 is a lens system consisting of a Fresnel lens or the like, and 18 is a fiber optic cable which receives the sunlight focused by the lens 11 and transmits the same to any desired place.

In case of focusing the sunlight through the lens system, the solar image has a central portion consisting of almost white light and a circumferential portion containing therein a large amount of light ray components of the wave lengths corresponding to the focal point of the lens system.

Namely, in the case of focusing the sunlight through the lens system, the focal point and the size of the solar image may vary in accordance with the component wavelengths of the light. For instance, the blue color light having a short wavelength makes a solar image of diameter D1 at position P1. Furthermore, the green color light makes a solar image of diameter D2 at position P2 and the red color light makes a solar image of diameter D3 at position P3. Consequently, as shown in FIG. 2, When the light-receiving end-surface of the fiber optic cable is set at position P1, it is possible to collect sunlight containing plenty of blue color components at the circumferential portion thereof.

When the light-receiving end-surface of the fiber optic cable is put at the position P2, it is possible to collect sunlight containing plenty of green color components at the circumferential portion thereof. When the light-receiving end-surface of the fiber optic cable is set at the position P3, it is possible to collect the sunlight containing plenty of the red color components at the circumferential portion thereof. In each case, the diameter of the fiber optic cable can be selected in accordance with the light ray components to be collected. For instance, the required diameters of the fiber optic cables may be D1, D2 and D3, respectively depending on the colors of the light rays to be stressed, i.e. blue, green and red. In such a way, the required amount of the fiber optic cable can be saved and thereby the sunlight containing therein plenty of the desired color components can be collected most effectively. And further, as shown in FIG. 1, if the diameter of the light-receiving end of the fiber optic cable is enlarged to D0, it may be possible to collect visible light containing therein all of its wavelength components.

FIGS. 3, 4 and 5 are views for explaining an embodiment of the stand which is created by the present invention for securely holding the above-mentioned solar ray collecting device on a veranda or on other similar places.

FIG. 3 shows a side view of the stand and FIG. 4 shows a plane view of the stand without the solar ray collecting device. FIG. 5 is a side view taken in the direction of the arrow P in FIG. 3. In these figures, 31 is for a veranda construction member standing at a right angle to the veranda's floor 32. 33 is an upper base whereon a solar ray collecting device is secured. The base 33 has at the center of its bottom surface a vertical pipe 38 which is adjustably inserted into a fixed, vertical pipe 37 secured at the base 35. The lower base is provided with a plurality of reinforcing plates 36 and placed on the veranda's floor 32. The movable pipe 38 can be fixed at a desired level in the fixed pipe 37 by means of fixing bolts 39 screwed in through holes pierced in the upper wall of the fixed pipe 37. Furthermore, the upper base has a hanging means 34 which by removably locking its L-shaped arm 34a onto the veranda's supporting member 31 makes it stable and safe to support the solar ray collecting device 20.

In the case of the illustrated embodiment, the hanging means 34 is constructed of angle members and connected to each other to form a frame of which a fixing portion 34c is secured to the base 33 and an arm portion 34b and an L-shaped portion 34a are intended to be hooked onto the veranda's construction member. However, the hanging means is not always made in the way described above.

The stand may comprise the lower fixed base 35 placed parallel to the veranda's supporting member 31, the fixed vertical pipe 37, the vertical pipe 38 being movably inserted and firmly secured at any desired level in the fixed pipe 37, the upper base 33 having said adjustable pipe 38 at the center of its bottom surface, and the hanging means 34 or a similar means capable of being secured at its one end onto the upper base 33 and being fixed at another end onto the supporting member 31.

Namely, the stand can be firmly secured by its lower fixed base 35 onto the existing floor 32 and by its hanging means 34 onto the existing supporting member 31. Furthermore, since the veranda's floor 32 usually has a surface 32a not finished horizontally but with a slope as shown in FIG. 3, an additional means 40 is provided so as to keep the fixed lower base 35 in a horizontal state.

FIG. 6 shows another hanging means intended for use in case of fixing the sand to an existing supporting member i.e. a fence made of steel pipes, omitting the solar ray collecting device and part of the stand. In FIG. 6, an existing supporting member 51 made of a vertical tube is provided with a horizontal fence pipe 52 secured thereon. The hanging means can be fixed to the fence pipe 52 in such a manner that a semi-circular hook 53 with a threaded end 53a is fitted onto the fence pipe 52 of the supporting member 51 and its threaded end 53a is inserted through a hole of an arm 34b and tightened by a nut 54 to firmly press the arm against the fence pipe.

As is apparent from the foregoing description, by using a stand according to the present invention, it may be possible to securely place a small type of solar ray collecting device onto any house. In case of placing the solar ray collecting device on the usual stand which is secured only onto the supporting floor, that is, on a stand having only a cantilever fixing point, the solar ray collecting device cannot be kept stable against the possible vibrations of an earthquake.

On the other hand, in the present invention, since the stand can be secured with a fixed base and also by a hanging means to the supporting member, it may provide a stable and safe support for the solar ray collecting device. Furthermore, said stand is small and compact to save space.

I claim:

1. The combination comprising a solar ray collecting device and a stand means for mounting said solar ray collecting device on a veranda structure having a base portion and an upper edge portion, said solar ray collecting device comprising a cylindrical body having a longitudinal axis and upper and lower longitudinal ends, a transparent dome mounted on said upper longitudinal end of said cylindrical body, solar ray collecting means disposed within said transparent dome, said stand means comprising a base member secured to said lower longitudinal end of said cylindrical body, said stand means further comprising a vertical upright support having an upper end secured to said base member and a lower end supported on said base portion of said veranda structure such than said vertical upright support supports said base member in a position overlying said base portion of said veranda structure, said stand means further comprising a hanging means adapted to be hung from said upper edge portion of said veranda structure, said hanging means comprising an inverted U-shaped section having two spaced upright legs and a connecting base connecting said two spaced upright legs, one of said two spaced upright legs having a transverse arm, said transverse arm being connected to said base member, whereby said vertical upright support and said hanging means are operable to support said solar ray collecting device on said base portion and on said upper edge portion of said veranda structure.

2. The combination according to claim 1, wherein said vertical upright support comprises length adjusting means for adjusting the length of said vertical upright support.

3. The combination comprising a solar ray collecting device, a stand means for said solar ray collecting device, and a veranda structure on which said stand means mounts said solar ray collecting device, such veranda structure having a base portion and an upper edge portion, said solar ray collecting device comprising a cylindrical body having a longitudinal axis and upper and lower longitudinal ends, a transparent dome mounted on said upper longitudinal end of said cylindrical body, solar ray collecting means disposed within said transparent dome, said stand means comprising a base member secured to said lower longitudinal end of said cylindrical body, said stand means further comprising a vertical upright support having an upper end secured to said base member and a lower end supported on said base portion of said veranda structure such that said vertical upright support supports said base member in a position overlying said base portion of said veranda structure, said stand means further comprising hanging means hung from said upper edge portion of said veranda structure, said hanging means comprising an inverted U-shaped section having two spaced upright legs and a connecting base connecting said two spaced upright legs, one of said two spaced upright legs having a transverse arm, said transverse arm being connected to said base member, whereby said vertical upright support and said hanging means are operable to support said solar ray collecting device on said base portion and on said upper edge portion of said veranda structure.

4. The combination according to claim 3, wherein said vertical upright support has a bottom support disposed on said base portion of said veranda structure, and level adjustment means between said bottom support and said base portion of said veranda structure.

5. The combination comprising a solar ray collecting device and a stand means for mounting said solar ray collecting device on a structure having a base portion and an upper end portion, said solar ray collecting device comprising a cylindrical body having a longitudinal axis and upper and lower longitudinal ends, a transparent dome mounted on said upper longitudinal end of said cylindrical body, solar ray collecting means disposed within said transparent dome, said stand means comprising a base member secured to said lower longitudinal end of said cylindrical body, said stand means further comprising a vertical upright support having an upper end secured to said base member and a lower end supported on said base portion of said structure such that said vertical upright support supports said base member in a position overlying said base portion of said structure, said stand means further comprising hanging means adapted to be hung from said upper end portion of said structure, said hanging means comprising a U-shaped hook extending over said upper end portion of said structure, said U-shaped hook having an extended section, first fastening means on said extended section, said hanging means further comprising an L-shaped member having one leg with an opening which receives said extended section, second fastening means secured to said first fastening means on said extended section to thereby secure said L-shaped member to said U-shaped hook, said L-shaped section having another leg extending perpendicular to said one leg, said base member being secured to said other leg of said L-shaped member, whereby said vertical upright support and said hanging means are operable to support said solar ray collecting device on said base portion and on said upper end portion of said structure.

6. The combination comprising a solar ray collecting device, a stand means for mounting said solar ray collecting device, and a veranda structure on which said stand means mounts said solar ray collecting device, said structure having a base portion and an upper end portion, said solar ray collecting device comprising a cylindrical body having a longitudinal axis and upper and lower longitudinal ends, a transparent dome mounted on said upper longitudinal end of said cylindrical body, solar ray collecting means disposed within said transparent dome, said stand means comprising a base member secured to said lower longitudinal end of said cylindrical body, said stand means further comprising a vertical upright support having an upper end secured to said base member and a lower end supported on said base portion of said structure such that said vertical upright support supports said base member in a position overlying said base portion of said structure, said stand means further comprising hanging means hung from said upper end portion of said structure, said hanging means comprising a U-shaped hook extending over said upper end portion of said structure, said U-shaped hook having an extended section, first fastening means on said extended section, said hanging means further comprising an L-shaped member having one leg with an opening which receives said extended section, second fastening means secured to said first fastening means on said extended section to thereby secure said L-shaped member to said U-shaped hook, said L-shaped section having another leg extending perpendicular to said one let, said base member being secured to said other leg of said L-shaped member, whereby said vertical upright support and said hanging means are operable to support said solar ray collecting device on said base portion and on said upper end portion of said structure.

7. The combination according to claim 6, wherein said structure comprises a fence pipe over which said U-shaped hook extends.

* * * * *